H. C. SUCKERT.
OIL LEVEL TESTER FOR ENGINE CRANK CASES.
APPLICATION FILED DEC. 23, 1915.
1,314,028.
Patented Aug. 26, 1919.
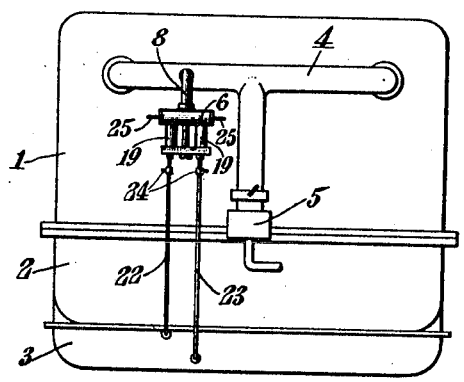
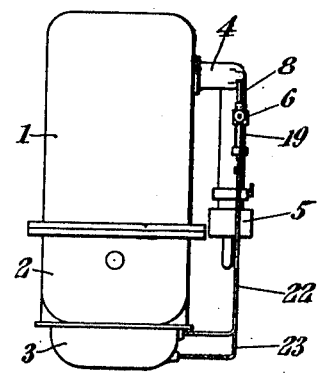
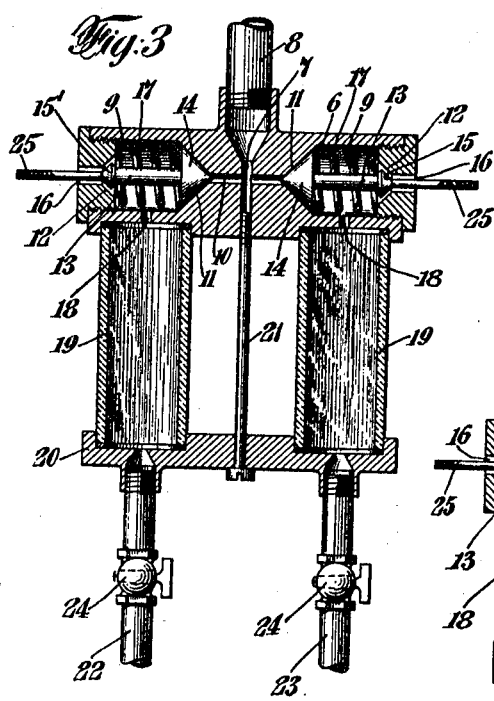
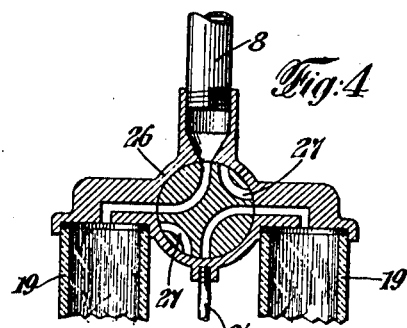
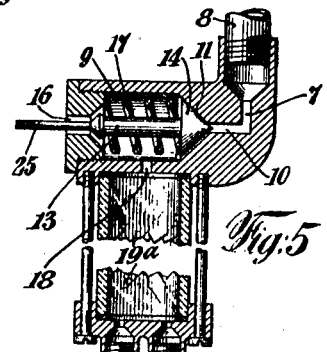
INVENTOR
Harold C. Suckert,
BY
his ATTORNEYS.

UNITED STATES PATENT OFFICE.

HAROLD C. SUCKERT, OF NEW YORK, N. Y.

OIL-LEVEL TESTER FOR ENGINE CRANK-CASES.

1,314,028.   Specification of Letters Patent.   Patented Aug. 26, 1919.

Application filed December 23, 1915. Serial No. 68,332.

*To all whom it may concern:*

Be it known that I, HAROLD C. SUCKERT, a citizen of the United States, and resident of the borough of Manhattan, city, county, and State of New York, have invented certain new and useful Improvements in Oil-Level Testers for Engine Crank-Cases, of which the following is a specification.

One of the objects of this invention is to provide a simple device by means of which the approximate level of the oil in the sump or oil well directly below the crank case of a gasolene engine, may be readily ascertained. It is quite essential that a sufficient quantity of oil be maintained in the oil sump or well. These oil wells are under the engine and are too shallow to permit of the use of a float-operated indicator. It has been the usual practice to provide the sump with testing tubes at different levels, and to provide said tubes with valves so that by opening said valves the approximate level of the oil might be determined. These valves are usually under the engine and are inaccessible, and frequently become so clogged with dirt as to be inoperative.

It is the further object of this invention to provide a testing device of the character described which may be placed in a convenient position near the engine so that it will be readily accessible; and to provide means whereby the suction of the engine may be utilized for operating the indicator or tester.

In the drawing, Figure 1 is a front elevation of an engine equipped with the oil level testing device;

Fig. 2 an end view thereof;

Fig. 3 a vertical sectional view of the testing device;

Fig. 4 a similar view of a slight modification of the testing device; and

Fig. 5 a similar view of another slightly varied form of the tester.

Referring to the various parts by numerals, 1 designates the engine, 2 the crank case thereof, 3 the oil well or sump under the crank case, 4 the intake manifold of the engine, and 5 the carbureter. Supported in any suitable manner near the intake manifold 4, is a valve device 6, said device being provided with a suction port 7, connected by pipe 8 to the intake manifold above the carbureter. The valve device 6 is formed with two valve chambers 9, each of which communicates with the exhaust port through ports 10. Each valve chamber is formed with a valve seat 11 at its inner end, and a valve seat 12 at its outer end. Mounted in each chamber is a double valve 13 having the larger valve 14 at its inner end, which is adapted to seat on the valve seat 11 and close communication between the valve chamber and the exhaust port 10; and having a smaller valve 15 adapted to seat on the valve seat 12 and close communication between the valve chamber and the port 16 which places said chamber in communication with the atmosphere. In each valve chamber is a spring 17 which bears against valve 14 and normally holds it seated. Each valve chamber is provided with an inlet port 18 which communicates with the interior of a sight-glass tube 19. The tubes 19 are held clamped between the valve device 6 and a bottom plate 20 by means of the clamp bolt 21. Communicating with the lower ends of the sight tubes are the test tubes 22 and 23, the tube 22 being somewhat shorter than its companion tube 23. The lower ends of these tubes enter the sump 3 at different levels, as shown clearly in Figs. 1 and 2. Each tube is provided with a stop cock 24 which is to be closed when the device is not in use, in order to prevent oil vapors rising through said pipes to the sight tubes. Each of the double valves is provided with an outwardly extending handle or stem 25 by means of which each of said valves may be drawn outwardly in order to unseat the valve 14 and to seat the valve 15. This operation places the exhaust pipe 8 in communication with the test tubes. Normally the valve 14 closes communication between the test tubes and the exhaust port and places the test tubes in communication with the atmosphere.

The operation of the apparatus thus far described is as follows: When testing to determine the approximate level of the oil in the sump the valves 24 are first opened. One of the stems 25 is then grasped and drawn outwardly to unseat its connected valve 14 and to seat its valve 15. This places the connected test tube in communication with the exhaust port. If the lower end of the test tube is below the level of the oil the suction through the tube will draw the oil up into the sight tube. This will indicate to the operator that the oil is above the level of that particular test tube. This operation may be repeated with the other test tube in order to determine whether or not the oil is above the level of that tube. It is obvious that if the tube extending to the higher level is tested first and it indicates that the level of the oil in the sump is at or above the lower end of said tube, it will be unnecessary to test through the tube extending to the lower level.

Instead of providing two double-seated valves, as shown in Fig. 1, I may employ a single rotary valve as shown at 26 in Fig. 4, said valve being provided with suitable ports so that by rotating it it places first one test tube and then the other in communication with the exhaust pipe 8. This valve is also provided with relief ports 27 in order to place the test tubes in communication with the atmosphere, so that the oil when drawn into said tubes, will be permitted to run back into the sump after the test.

Instead of employing two sight tubes or glasses 19, and two sets of valves, I may employ a single sight tube and one double-seated valve, as shown clearly in Fig. 5. In this arrangement of the device two test tubes are connected to the one sight tube 19ª, and each test tube is provided with a valve 24ª. In operating this form of the device only one of the valves 24ª is open when making a test. It is obvious that by opening the opening in the valve 24ª in tube 22ª, and then operating the double-seated valve, as hereinbefore described, the suction will be through the said test tube 22ª and an indication will be given as to whether or not the level of the oil is at or above the lower end of said tube. By closing the valve 24ª of tube 22ª and opening the valve in tube 23ª, the test may be made through that tube, as to the level of the oil in the sump.

What I claim is:

1. An oil level testing device comprising a test tube, a sight-glass connected thereto, an exhausting device, a valve device connecting said exhausting device to the sight-glass and said glass with the atmosphere, a double-seated valve, a spring normally holding said valve seated to close communication between the sight-glass and the exhausting means and to open communication between said glass and the atmosphere, and an operating stem connected to said valve whereby said valve may be operated to close the atmospheric port and open the exhaust port to place the sight-glass and test tube in communication with the exhaust.

2. An oil level testing device comprising a test tube, a sight-glass, a valve device provided with an exhaust port and an atmospheric port both communicating with the sight glass, a valve therein normally closing the exhaust port and opening the atmospheric port, an exhausting means communicating with the exhaust port, and means for moving said valve to open the exhaust port and close the atmospheric port.

3. An oil level testing device comprising a test tube, a sight-glass, a valve device provided with an exhaust port and an atmospheric port, a valve therein normally closing the exhaust port and opening the atmospheric port, and means for moving said valve to open the exhaust port and close the atmospheric port, and a valve in the test tube below the sight-glass.

4. An oil level testing device comprising a pair of test tubes extending to different levels, a sight glass for each of said tubes, an air exhausting means, a valve interposed between each sight glass and the exhausting means, and a valve in each test tube below the sight glasses.

5. An oil level testing device comprising a plurality of test tubes extending to different levels, sight glasses connected to each of said tubes, an air exhausting means connected to said sight glasses, valve devices between said exhausting means and each of said sight glasses normally closing communication between the exhausting means and the glasses and placing said glasses in communication with the atmosphere, and means for indepently operating said valve devices to open communication between any one of said sight glasses and the exhausting means and close communication between said glass and the atmosphere.

6. An oil level testing device comprising a test tube, a sight-glass connected at its lower end to the test tube, a valve controlling communication between the test tube and sight-glass, air-exhausting means connected with the upper end of the sight-glass, and a valve operable to place the sight-glass in communication with said air-exhausting means or with the atmosphere.

7. An oil level testing device comprising a test tube, a sight-glass connected at its lower end with the test tube, air-exhausting means, manually operable means for placing the upper end of the sight-glass in communication with said air-exhausting means or the atmosphere, and means for normally causing said manually operable means to open communication between the sight-glass and the atmosphere.

8. An oil level testing device comprising a plurality of test tubes extending to different levels, a sight glass for each tube, an exhausting means, and manually operable valve means interposed between the sight glasses and the exhausting means adapted to place either of said sight glasses and its associated test tube in communication with the exhausting means.

In testimony whereof I hereunto affix my signature.

HAROLD C. SUCKERT.